United States Patent
Sheng et al.

(10) Patent No.: US 6,227,571 B1
(45) Date of Patent: May 8, 2001

(54) TELESCOPING VEHICLE STEERING COLUMN APPARATUS FOR HELPING TO PROTECT A VEHICLE DRIVER

(75) Inventors: Jianping Sheng; Wei Mu, both of Rochester Hills; Chaozhuo Chen, Troy, all of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/432,466

(22) Filed: Nov. 3, 1999

(51) Int. Cl.[7] ........................................................ B62D 1/18
(52) U.S. Cl. ............................ 280/777; 280/731; 74/493
(58) Field of Search .................................. 280/750, 777, 280/775, 731; 180/282; 74/492, 493, 552

(56) References Cited

U.S. PATENT DOCUMENTS

| | | |
|---|---|---|
| 3,481,626 | 12/1969 | Fergle . |
| 3,600,003 | 8/1971 | Carey . |
| 3,801,123 * | 4/1974 | Jira ........................................ 280/777 |
| 4,337,967 | 7/1982 | Yoshida et al. . |
| 4,649,769 * | 3/1987 | Venable .................................. 74/493 |
| 4,968,058 | 11/1990 | Jones . |
| 5,295,712 | 3/1994 | Omura . |
| 5,342,089 * | 8/1994 | Fink et al. ............................ 280/731 |
| 5,398,963 * | 3/1995 | FÖhl ..................................... 280/731 |
| 5,482,320 | 1/1996 | Passebecq . |
| 5,507,521 | 4/1996 | Steffens, Jr. . |
| 5,570,901 * | 11/1996 | Fyrainer ............................... 280/731 |
| 5,609,356 * | 3/1997 | Mossi ................................... 280/731 |
| 5,618,058 | 4/1997 | Byon . |
| 5,700,031 * | 12/1997 | Heilig et al. ......................... 280/731 |
| 5,870,930 * | 2/1999 | Willett et al. .......................... 74/493 |
| 5,893,580 * | 4/1999 | Hoagland et al. .................... 280/777 |

FOREIGN PATENT DOCUMENTS

| | | | |
|---|---|---|---|
| 0417730 * | 3/1991 | (EP) ..................................... 280/775 |
| 2 633 888 * | 1/1990 | (FR) ..................................... 280/777 |

* cited by examiner

Primary Examiner—Lanna Mai
Assistant Examiner—Lynda Jasmin
(74) Attorney, Agent, or Firm—Tarolli, Sundheim, Covell, Tummino & Szabo L.L.P.

(57) ABSTRACT

An apparatus (12) comprises a first steering column member (40) rotatable about a first axis (26) and a steering wheel (20) mounted on the first steering column member. A second steering column member (100) is connected with the first steering column member (40) so that rotation of the first steering column member about the first axis (26) causes rotation of the second steering column member. The first and second steering column members (40 and 100) have a telescoping relationship and have axially overlapped portions (70, 108). An air bag module (30) is mounted on the steering wheel (20) and includes an inflatable air bag (32). An actuatable device (90) emits gas which causes the first and second steering column members (40 and 100) to telescope together and causes at least a portion of the air bag module (30) to move away from the vehicle driver as the air bag (32) is inflated.

13 Claims, 2 Drawing Sheets

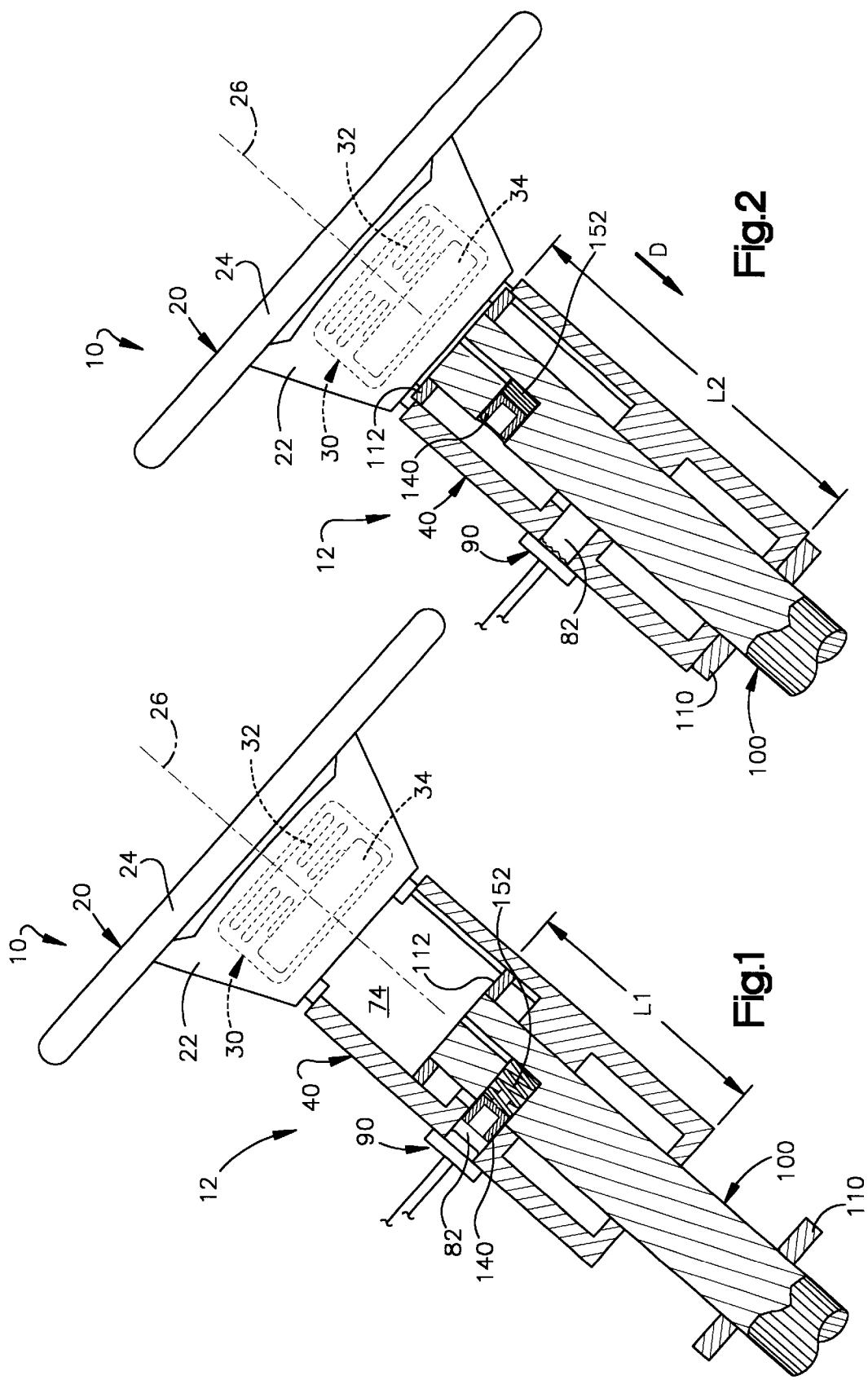

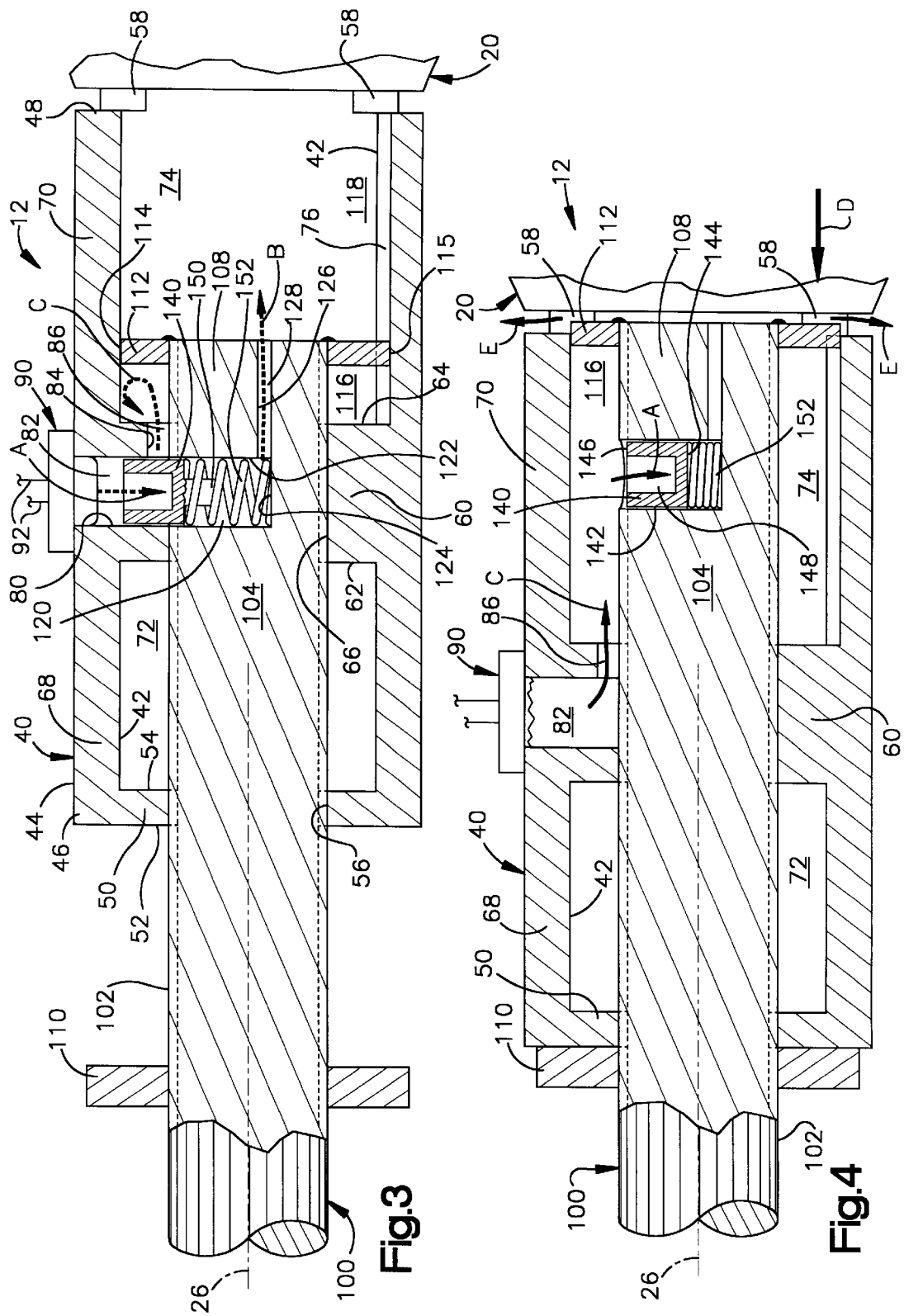

TELESCOPING VEHICLE STEERING COLUMN APPARATUS FOR HELPING TO PROTECT A VEHICLE DRIVER

TECHNICAL FIELD

The present invention relates to a telescoping vehicle steering column apparatus for helping to protect a vehicle driver in the event of a vehicle collision.

BACKGROUND OF THE INVENTION

It is known to help protect a vehicle occupant from injury during a vehicle collision by inflating an air bag in the passenger compartment of the vehicle. To help protect the driver of a vehicle, an air bag module containing an inflatable air bag is typically mounted in a central or hub portion of the vehicle's steering wheel.

As is known in the art, one of the challenges in the engineering of an air bag system is to help protect an occupant of a vehicle seat who is not properly seated or positioned in the vehicle seat. This so-called "out-of-position" occupant may not be wearing a seat belt. The challenge of helping to protect an out-of-position vehicle driver is even greater because the steering wheel, from which the air bag typically deploys, is located in close proximity to the driver. Thus, a need exists for an apparatus which allows the steering wheel, and the air bag module mounted on the steering wheel, to move away from an out-of-position vehicle driver during the initial stages of air bag deployment so that the impact load on the driver from the deploying air bag is reduced.

SUMMARY OF THE INVENTION

The present invention is an apparatus for a vehicle. The apparatus comprises a first steering column member rotatable about a first axis and a steering wheel mounted on the first steering column member to rotate the first steering column member about the first axis upon turning of the steering wheel. A second steering column member is connected with the first steering column member so that rotation of the first steering column member about the first axis causes rotation of the second steering column member. The first and second steering column members have a telescoping relationship and have axially overlapped portions. An air bag module is mounted on the steering wheel and includes an inflatable air bag which is inflatable into a position to help protect a vehicle driver in the event of an occurrence of a vehicle condition for which inflation of the air bag is desired. A device, when actuated, emits gas which causes the first and second steering column members to telescope together and at least a portion of the air bag module to move away from the vehicle driver as the air bag is inflated into the position.

BRIEF DESCRIPTION OF THE DRAWINGS

The foregoing and other features of the present invention will become apparent to those skilled in the art to which the present invention relates upon reading the following description with reference to the accompanying drawings, wherein:

FIG. 1 is a side view, partially in section, of an apparatus for helping to protect a vehicle driver, the apparatus being shown in a first condition;

FIG. 2 is a view similar to FIG. 1 showing the apparatus for helping to protect a vehicle driver in a second condition;

FIG. 3 is an enlarged view of a portion of FIG. 1; and

FIG. 4 is an enlarged view of a portion of FIG. 3.

DESCRIPTION OF A PREFERRED EMBODIMENT

The present invention relates to a telescoping vehicle steering column apparatus for helping to protect a vehicle driver in the event of a vehicle collision. The apparatus is applicable to vehicles of various constructions. As representative of the present invention, FIG. 1 illustrates a vehicle steering column assembly 10 having an apparatus 12 for helping to protect a vehicle driver.

The apparatus 12 includes a vehicle steering wheel 20 and first and second steering column members 40 and 100, respectively. The steering wheel 20 is fixedly secured, in a manner not shown, to the first steering column member 40. The steering wheel 20 has a centrally located hub portion 22 and a circumferentially extending rim portion 24 connected to the hub portion by spokes (not shown). The steering wheel 20 is rotatable about an axis 26 to cause steerable vehicle wheels (not shown) to turn laterally as is known in the art.

An air bag module 30, shown schematically in dashed lines in FIGS. 1 and 2, is mounted in the hub portion 22 of the steering wheel 20. The air bag module 30 includes an inflatable air bag 32 and an actuatable inflator 34 for inflating the air bag. The inflator 34 is operatively coupled with one or more collision sensors (not shown) which sense a vehicle condition, such as deceleration above a predetermined threshold, indicative of a vehicle collision and which cause the inflator to be actuated. The air bag 32, when inflated by the inflator 34, inflates into a position in the passenger compartment of a vehicle which helps to protect the vehicle driver in the event of a vehicle collision.

The first steering column member 40 is fixed for rotation about the axis 26 upon turning of the steering wheel 20. The first steering column member 40 has cylindrical inner and outer surfaces 42 and 44 (see FIG. 3), respectively, extending between first and second ends 46 and 48, respectively. The first end 46 of the first steering column member 40 includes a radially extending end wall 50 defined by parallel end wall surfaces 52 and 54, respectively. The end wall 50 includes an opening (not numbered) defined by an axial surface 56. The axial surface 56 is centered on the axis 26 and includes splines. The second end 48 of the first steering column member 40 connects to the steering wheel 20 and includes a pair of diametrically opposed vent holes 58.

Between the first and second ends 46 and 48, the first steering column member 40 has an annular bearing portion 60 projecting radially inward from the cylindrical inner surface 42. The bearing portion 60 includes radially extending first and second surfaces 62 and 64, respectively, and an inner bearing surface 66. The inner bearing surface 66 includes splines. The bearing portion 60 divides the first steering column member 40 into first and second portions 68 and 70, respectively. The first surface 62 of the bearing portion 60, the cylindrical inner surface 42, and the surface 54 of the end wall 50 together define a first chamber 72 in the first portion 68 of the first steering column member 40. The second surface 64 of the bearing portion 60 and the cylindrical inner surface 42 together define a second chamber 74 in the second portion 70 of the first steering column member 40. An axially extending groove 76 is formed in the inner surface 42 of the first steering column member 40 inside the second chamber 74.

The bearing portion 60 of the first steering column member 40 includes a radially extending cylindrical surface 80 defining a radial opening 82. The radial opening 82 extends from the cylindrical outer surface 44 to the inner bearing surface 66. An axially extending surface 84 defines a passage 86 which connects the radial opening 82 in fluid communication with the second chamber 74.

An actuatable pyrotechnic device 90 is secured to the first steering column member 40 and extends partially into the radial opening 82 in the bearing portion 60. The pyrotechnic device 90 contains a pyrotechnic material (not shown) which, when the pyrotechnic device is actuated, produces combustion products and gas under pressure. The pyrotechnic device 90 is operatively coupled by electrical wires 92 with sensors (not shown) which sense the position of the driver in the driver's seat of the vehicle and which cause the pyrotechnic device to be actuated.

The second steering column member 100, only a part of which is shown, is a cylindrical shaft which has a splined outer surface 102. The splined outer surface 102 of the second steering column member 100 mates with splined surfaces 56 and 66 on the first steering column member 40 to connect the first and second steering column members for rotation about the axis 26. A portion 104 of the second steering column member 100 is disposed within the first steering column member 40 and is thus overlapped by the first steering column member. An end portion 108 of the second steering column member 100 is disposed in the second chamber 74. The first and second steering column members 40 and 100 have a telescoping relationship as described further below.

The second steering column member 100 includes a stopper flange 110 and a piston flange 112. The stopper flange 110 is disposed outside the first steering column member 40 and is attached to the outer surface 102 of the second steering column member 100 in a known manner, such as by welding. The piston flange 112 is located at the terminal end of the second steering column member 100 and is disposed inside the second chamber 74 in the second steering column member. The piston flange 112 is attached to the outer surface 102 of the second steering column member 100 in a known manner, such as by welding, and divides the second chamber 74 into first and second sections 116 and 118, respectively. The piston flange 112 has a cylindrical outer surface 114 which slidingly engages the inner surface 42 of the first steering column member 40. The cylindrical outer surface 114 of the piston flange 112 includes a radially projecting tab 115 which is located in the groove 76 in the inner surface 42 to prevent relative rotation between the first and second steering column members 40 and 100.

The second steering column member 100 further includes a radially extending bore 120 located near the piston flange 112. The radial bore 120 extends partially through the second steering column member 100 and is defined by a cylindrical surface 122 and a lower surface 124. The radial bore 120 in the second steering column member 100 and the radial opening 82 in the first steering column member 40 are identical in diameter and radially alignable with one another. An axially extending cylindrical surface 126 defines an axial channel 128 which fluidly connects the radial bore 120 in fluid communication with the first section 116 of the second chamber 74.

A cylindrical pin 140 is slidable into the radial opening 82 in the bearing portion 60 of the first steering column member 40. The pin 140 has a cylindrical outer surface 142 (FIG. 4) and inner and outer end surfaces 144 and 146, respectively. The pin 140 includes a cavity 148 extending inward toward the inner end surface 144 from the outer end surface 146 of the pin. An extension 150 (FIG. 3) projects radially inward from the inner end surface 144 of the pin 140.

A spring 152 is located in the radial bore 120 in the second steering column member 100. One end of the spring 152 abuts the lower surface 124 of the radial bore 120. The other end of the spring 152 fits over the extension 150 on the pin 140 and abuts the inner end surface 144 of the pin. The spring 152 biases the pin 140 radially outward.

Under normal driving conditions, the components of the apparatus 12 are in a non-actuated condition shown in FIGS. 1 and 3. In the non-actuated condition, a predetermined first length L1 (FIG. 1) of the first and second steering column members 40 and 100 overlap each other. Further, the radial bore 120 in the second steering column member 100 is radially aligned with the radial opening 82 in the first steering column member 40. The first and second column members 40 and 100 are maintained in the non-actuated condition by a releasable mechanism comprising the pin 140 and the spring 152.

In the non-actuated condition, the pin 140 is in a first position in which it is partially disposed in the radial opening 82 in the first steering column member 40 and is also partially disposed in the radial bore 120 in the second steering column member 100. In the first position, the presence of respective portions of the pin 140 in both the radial opening 82 and the radial bore 120 blocks relative axial movement of the first and second steering column members 40 and 100. Further, in the first position, the pin 140 covers the passage 86. The pin 140 is maintained in its first position by the bias of the spring 152.

In the event the collision sensors sense a vehicle condition for which inflation of the air bag 32 is desired to help protect a vehicle occupant, the inflator 34 in the air bag module 30 is actuated and begins inflating the air bag 32. In addition, the position sensors transmit signals indicative of the position of the vehicle driver in the driver's seat. If the driver is properly seated in the driver's seat and wearing a seat belt, the pyrotechnic device 90 may not be actuated. Assuming, for the sake of explanation, that the driver is determined by the position sensors to be out-of-position and/or not wearing a seat belt, the pyrotechnic device 90 attached to the first steering column member 40 is actuated. Depending on a set of predetermined performance criteria for the air bag module 30, such as the severity of the collision and the specific position of the driver, the pyrotechnic device 90 may be actuated before, after, or at the same time as the inflator 34.

Actuation of the pyrotechnic device 90 produces combustion products, including gas under pressure, inside the radial opening 82 in the first steering column member 40. The combustion products create a force acting against the outer end surface 146 of the pin 140, and against the surfaces (not numbered) defining the cavity 148 in the pin. This force moves the pin 140 radially inward, in the direction indicated by arrow A in FIG. 3, against the bias of the spring 152. The channel 128 in the second steering column member 100 allows for air trapped underneath the pin 140 in the radial bore 120 to escape into the second chamber 74, as shown by arrow B, as the pin moves farther into the radial bore.

The force acting on the pin 140 pushes the pin out of the radial opening 82 in the first steering column member 40 and into an actuated position in which the pin is entirely disposed in the radial bore 120 in the second steering column member 100. With the pin 140 located in the radial bore 120, the first and second steering column members 40 and 100 are released for telescopic axial movement. The movement of the pin 140 out of the radial opening 82 also exposes the passage 86 leading to the first section 116 of the second chamber 74. The combustion products, including pressurized gas, created by the actuation of the pyrotechnic device 90 begin flowing through the passage 86, as indicated by arrow C, and into the first section 116 of the second chamber 74.

The combustion products, including pressurized gas, fill the first section 116 of the second chamber 74 and begin to increase the volume of the first section while correspondingly decreasing the volume of the second section 118 of the second chamber. The force created by the combustion products continues to hold the pin 140 in the radial bore 120 as the first section 116 of the second chamber 74 expands. The expansion of the first section 116 of the second chamber 74 is realized by the first steering column member 40 moving telescopically relative to the second steering column member 100. The first steering column member 40 moves axially in the direction of arrow D (FIG. 4) by the force of the pressurized gas acting on the piston flange 112 to expand the first section 116 of the second chamber 74. Air on the other side of the piston flange 112 in the second section 118 of the second chamber 74 is pushed out through the vent holes 58 as shown by arrows E.

The axial telescopic movement of the first steering column member 40 relative to the second steering column member 100 continues until the end wall 50 of the first steering column member contacts the stopper flange 110 on the second steering column member. By this point, the piston flange 112 has traveled to the end of the second chamber 74, thereby eliminating the second section 118 of the second chamber. In the fully actuated condition shown in FIGS. 2 and 4, the first and second steering column members 40 and 100 overlap each other by a second length L2 (FIG. 2) which is greater than the first overlap length L1. The difference between the overlap length L2 and the overlap length L1 results in the steering wheel 20 and at least a portion of the air bag module 30 being moved away from the out-of-position driver so that the air bag is better positioned to help protect the driver.

From the above description of the invention, those skilled in the art will perceive improvements, changes and modifications. For example, the pyrotechnic device 90 can be operatively coupled with the collision sensors in the vehicle and thus actuatable in the event of a vehicle collision regardless of the position of the vehicle driver. Such improvements, changes and modifications within the skill of the art are intended to be covered by the appended claims.

Having described the invention, we claim:

1. An apparatus for a vehicle, said apparatus comprising:
    a first steering column member rotatable about a first axis;
    a steering wheel mounted on said first steering column member to rotate said first steering column member about said first axis upon turning of said steering wheel;
    a second steering column member connected with said first steering column member so that rotation of said first steering column member about said first axis causes rotation of said second steering column member, said first and second steering column members having a telescoping relationship and having axially overlapped portions;
    an air bag module mounted on said steering wheel and including an inflatable air bag which is inflatable into a position to help protect a vehicle driver in the event of an occurrence of a vehicle condition for which inflation of the air bag is desired; and
    an actuatable device which, when actuated, emits gas which causes said first and second steering column members to telescope together and at least a portion of said air bag module to move away from the vehicle driver as said air bag is inflated into said position.

2. The apparatus of claim 1 further comprising a releasable mechanism for maintaining said first and second steering column members in positions relative to each other such that they overlap for a first predetermined length, said releasable mechanism, when released due to actuation of said actuatable device, enables said first and second steering column members to move axially and overlap for a second length greater than said first length.

3. The apparatus of claim 2 wherein said releasable mechanism comprises a pin and a spring, said first and second steering column members having aligned radially extending openings, said pin having a position into which said pin is biased by said spring and in which said pin has portions in both of said aligned radially extending openings to block relative axial movement of said first and second steering column members.

4. The apparatus of claim 3 wherein said actuatable device, when actuated, produces combustion products which move said pin against said spring bias to enable relative axial movement of said first and second steering column members.

5. The apparatus of claim 1 wherein said actuatable device produces gas under pressure which moves said first steering column member relative to said second steering column member to telescope said steering column members together.

6. The apparatus of claim 5 wherein said first steering column member has a first portion defining a chamber with a portion of said second steering column member, said actuatable device when actuated generating gas which is directed into said chamber, the pressure of said gas in said chamber moving said first steering column member axially relative to said second steering column member.

7. The apparatus of claim 6 further including a releasable mechanism comprising a pin and a spring, said first and second vehicle steering column members having aligned radially extending openings, said pin having a position into which said pin is biased by said spring and in which said pin has portions in both of said aligned openings to block relative axial movement of said first and second steering column members, said gas produced by said actuatable device acting on said pin and moving said pin out of the aligned opening in one of said first and second steering column members in which the pin is located,
    said apparatus further including means defining a passage communicating said aligned opening from which said pin is moved with said chamber, said pin, when moved out of said aligned opening, exposing said passage to enable said gas produced by said actuatable device to be directed into said chamber through said passage to move said first steering column member relative to said second steering column member.

8. An apparatus for a vehicle, said apparatus comprising:
    a first steering column member rotatable about a first axis;
    a second steering column member rotatable about said first axis and connected to said first steering column member for joint rotation;
    said first and second steering column members having a telescoping relationship with axially overlapped portions;
    a releasable mechanism for maintaining said first and second steering column members in positions relative to each other such that they overlap for a first predetermined length, said releasable mechanism when released enabling said first and second steering column members to overlap for a second length greater than said first length; and an actuatable device for emitting gas to actuate said releasable mechanism and for causing relative movement of said first and second steering column members to a position where said members overlap for said second length.

9. The apparatus of claim 8 wherein said releasable mechanism comprises a pin and a spring, said first and second steering column members having aligned radially extending openings, said pin having a position into which said pin is biased by said spring and in which said pin has portions in both of said aligned radially extending openings to block relative axial movement of said first and second steering column members.

10. The apparatus of claim 9 wherein said actuatable device for emitting gas, when actuated, emits gas that moves said pin against said spring bias to enable relative axial movement of said first and second steering column members.

11. The apparatus of claim 10 wherein said one steering column member has a first portion defining a chamber with a portion of said other steering column member, said actuatable device for emitting gas, when actuated, emitting gas that is directed into said chamber and the pressure of said gas in said chamber moving said one steering column member axially relative to the other steering column member.

12. The apparatus of claim 8 further including a steering wheel mounted on one of said first and second steering column members, said gas moving said one steering column member relative to the other steering column member to telescope said steering column members together.

13. The apparatus of claim 8 wherein said releasable mechanism comprises a pin and a spring, said vehicle steering column members having aligned radially extending openings, said pin having a position into which said pin is biased by said spring and in which said pin has portions in both of said aligned openings to block relative axial movement of said vehicle steering column members, said gas produced by said actuatable device acting on said pin and moving said pin out of the aligned opening in which the pin is located, said apparatus further including a passage communicating said aligned opening from which said pin is moved with said chamber, said pin, when moved out of said aligned opening, exposing said passage to enable said gas produced by said actuatable device to be directed into said chamber through said passage to move said one steering column member relative to the other steering column member.

\* \* \* \* \*